United States Patent
Wu et al.

(10) Patent No.: US 9,337,731 B2
(45) Date of Patent: May 10, 2016

(54) POWER CONVERTER FOR GENERATING BOTH POSITIVE AND NEGATIVE OUTPUT SIGNALS

(71) Applicant: LINEAR TECHNOLOGY CORPORATION, Milpitas, CA (US)

(72) Inventors: Albert M. Wu, Colorado Springs, CO (US); Matthew Anthony Topp, Colorado Springs, CO (US)

(73) Assignee: LINEAR TECHNOLOGY CORPORATION, Milpitas, CA (US)

( * ) Notice: Subject to any disclaimer, the term of this patent is extended or adjusted under 35 U.S.C. 154(b) by 397 days.

(21) Appl. No.: 13/851,250

(22) Filed: Mar. 27, 2013

(65) Prior Publication Data

US 2014/0167715 A1    Jun. 19, 2014

Related U.S. Application Data

(60) Provisional application No. 61/736,861, filed on Dec. 13, 2012.

(51) Int. Cl.
| | |
|---|---|
| G05F 1/00 | (2006.01) |
| H02M 3/158 | (2006.01) |
| H02M 7/537 | (2006.01) |

(52) U.S. Cl.
CPC .............. H02M 3/158 (2013.01); H02M 7/537 (2013.01)

(58) Field of Classification Search
USPC ........ 363/89, 17, 16, 127, 285; 323/288, 271, 323/224
See application file for complete search history.

(56) References Cited

U.S. PATENT DOCUMENTS 4,931,716 A * 6/1990 Jovanovic et al. ............. 323/285
5,367,448 A * 11/1994 Carroll ............................ 363/89

(Continued)

FOREIGN PATENT DOCUMENTS

| CN | 1925290 A | | 3/2007 |
|---|---|---|---|
| JP | WO2009/016898 | * | 5/2009 |

(Continued)

OTHER PUBLICATIONS

International Search Report issued in corresponding International Application No. PCT/US2013/075054, mailed on Apr. 29, 2015.

(Continued)

*Primary Examiner* — Jessica Han
*Assistant Examiner* — Lorena Bruner
(74) *Attorney, Agent, or Firm* — McDermott Will & Emery LLP

(57) ABSTRACT

A power converting system produces an input signal regulated with respect to an input signal. The power converting system has a first inductive element having a first node coupled to an input node, and a second inductive element having a first node coupled to an output node. A first switching element is coupled to a second node of the first inductive element. A first capacitive element is coupled between the second node of the first inductive element and of the second inductive element. A control circuit sets a duty cycle of the first switching element to a first value for providing the output signal of a first polarity responsive to the input signal of the first polarity, and to set the duty cycle of the first switching element to a second value for providing the output signal of a second polarity responsive to the input signal of the first polarity.

31 Claims, 8 Drawing Sheets

(56) References Cited

U.S. PATENT DOCUMENTS

| | | | |
|---|---|---|---|
| 6,141,232 | A | 10/2000 | Weinmeier et al. |
| 6,181,120 | B1 | 1/2001 | Hawkes et al. |
| 6,822,427 | B2* | 11/2004 | Wittenbreder ................ 323/282 |
| 7,425,819 | B2 | 9/2008 | Isobe |
| 7,778,046 | B1 | 8/2010 | Cuk et al. |
| 2006/0132102 | A1 | 6/2006 | Harvey |
| 2007/0013356 | A1 | 1/2007 | Qiu et al. |
| 2007/0164720 | A1* | 7/2007 | Lalithambika et al. ....... 323/288 |
| 2007/0285066 | A1 | 12/2007 | Lipcsei et al. |
| 2008/0174287 | A1 | 7/2008 | Park |
| 2008/0278092 | A1 | 11/2008 | Lys et al. |
| 2011/0101932 | A1 | 5/2011 | Nakazono |
| 2011/0279098 | A1 | 11/2011 | Ren et al. |
| 2013/0121033 | A1* | 5/2013 | Lehn .................... H02M 3/335 363/17 |
| 2013/0207470 | A1* | 8/2013 | Stoev ................... H02M 3/158 307/43 |
| 2013/0229844 | A1* | 9/2013 | Gazit ................... H02M 3/158 363/123 |

FOREIGN PATENT DOCUMENTS

| | | |
|---|---|---|
| TW | 201220659 A | 5/2012 |
| TW | 201243812 A | 11/2012 |

OTHER PUBLICATIONS

International Preliminary Report on Patentability and Written Opinion issued in corresponding International Application No. PCT/US2013/075054, dated Jun. 16, 2015.

Taiwanese Search Report issued in corresponding Taiwanese Patent Application No. 102146169, dated Jun. 26, 2015; with partial English translation.

* cited by examiner

POWER CONVERTER FOR GENERATING BOTH POSITIVE AND NEGATIVE OUTPUT SIGNALS

The present application claims priority of U.S. provisional patent application No. 61/736,861 filed on Dec. 13, 2012 and entitled DC/DC Converter For Generating Both Positive and Negative Output Voltages, incorporated herewith by reference.

TECHNICAL FIELD

This disclosure relates to power supply systems, and more particularly, to a power converter that generates a DC or AC output signal having a positive polarity, negative polarity or a zero value based on the same input signal.

BACKGROUND ART

A conventional power converter can convert an input signal into an output signal having the same or opposite polarity with respect to the input signal. However, a conventional power converter topology is not able to produce both positive and negative output signals regulated with respect to the same input signal.

Therefore, there is a need in a new power converter topology capable of generating both positive and negative output signals based on the same input.

SUMMARY OF THE DISCLOSURE

In accordance with one aspect, the present disclosure provides a power converting system responsive to an input signal to produce an output signal regulated with respect to the input signal. The power converting system has an input node for receiving the input signal, an output node for producing the output signal, and first and second inductive elements. The first inductive element has a first node coupled to the input node, the second inductive element has a first node coupled to the output node. A first switching element is coupled to a second node of the first inductive element. A first capacitive element is coupled between the second node of the first inductive element and a second node of the second inductive element. A control circuit is provided for controlling the first switching element. The control circuit is configured to set a duty cycle of the first switching element to a first value for providing the output signal of a first polarity in response to the input signal of the first polarity, and to set the duty cycle of the first switching element to a second value for providing the output signal of a second polarity in response to the input signal of the first polarity.

For example, the first value of the duty cycle may be in a first duty cycle range, and the second value of the duty cycle may be in a second duty cycle range higher than the first duty cycle range.

The control circuit may be further configured to set the duty cycle to a third value between the first duty cycle range and the second duty cycle range to provide a zero amplitude signal at the output node.

A second switching element may be coupled between the first node of the first inductive element and the second node of the second inductive element. The second switching element may be turned off when the first switching element is turned on, and may be turned on when the first switching element is turned off.

An input filtering capacitive element may be coupled to the input node, and an output filtering capacitive element may be coupled to the output node.

In one exemplary embodiment of the present disclosure, a regulated DC output signal is produced at the output node in response to a DC input signal at the input node.

In another exemplary embodiment, a regulated AC output signal is produced at the output node in response to a DC input signal at the input node.

For example, the control circuit may be configured for sensing a combined current in the first and second inductive elements to control the first switching element.

Also, to control the first switching element, the control circuit may be configured for sensing an output voltage of the power converting system, an output current of the power converting system, an input voltage of the power converting system, and/or an input current of the power converting system.

In accordance with an exemplary implementation, the control circuit may include an adjustable voltage reference block controlled by a control signal to produce a variable reference signal having a positive voltage value, a negative voltage value or a zero voltage value.

The control circuit may compare the variable reference signal with a signal representing the output voltage of the converting system, to produce a voltage control (VC) signal.

The control circuit may further compare the VC signal with a signal representing a combined current in the first and second inductive elements, to produce a driving signal that controls switching of the first switching element.

The control circuit may include an inductive current sensing and slope compensation circuit for producing the signal representing a combined current in the first and second inductive elements.

The inductive current sensing and slope compensation circuit may comprise a ramp generator controlled by an oscillator for producing a ramp signal.

The inductive current sensing and slope compensation circuit may further include a current sensor for sensing the combined current in the first and second inductive elements, and an adder responsive to the ramp signal and to an output signal of the current sensor for producing the signal representing a sensed combined current in the first and second inductive elements.

The control circuit may further include a latching circuit controlled by an output signal of the oscillator and by an output signal of a comparator that compares the voltage control signal with the signal representing a combined current in the first and second inductive elements. The latching circuit may be configured to produce the driving signal that controls switching of the first switching element.

In accordance with another exemplary implementation, the control circuit may include an adjustable current reference block responsive to a control signal for producing a current reference value of variable amplitude and polarity at a reference node coupled to the output node of the power converting system. A signal at the reference node may be compared with a fixed value to produce a voltage control (VC) signal.

The control circuit may compare the VC signal with a signal representing a combined current in the first and second inductive elements, to produce a driving signal that controls switching of the first switching element.

In accordance with a method of the present disclosure, an output signal is produced in response to an input signal using a power converter having an input node for receiving the input signal, and output node for producing the output signal, a first inductive element coupled to the input node, a second inductive element coupled to the output node, a first capacitive element coupled between the first inductive element and the second inductive element, and a first switching element coupled to the first capacitive element.

The first switching element is controlled to produce the output signal regulated with respect to the input signal. A duty cycle of the first switching element is set to a first value to produce the output signal of a first polarity in response to the input signal of the first polarity, and set to a second value to produce the output signal of a second polarity in response to the input signal of the first polarity. The first value may be in a first duty cycle range, and the second value may be in a second duty cycle range higher than the first duty cycle range.

Also, the duty cycle may be set to a third value between the first duty cycle range and the second duty cycle range to produce a zero amplitude signal at the output node.

The power converter may have a second switching element coupled between the input node and the second inductive element. The second switching element may be turned off when the first switching element is turned on, and may be turned on when the first switching element is turned off.

For example, the step of controlling the first switching element may include sensing a combined current in the first and second inductive elements.

In one exemplary embodiment, the step of controlling the first switching element may further include producing a variable reference signal having a positive voltage value, a negative voltage value or a zero voltage value.

In another exemplary embodiment, the step of controlling the first switching element may further include producing a current reference value of variable amplitude and polarity at a reference node coupled to the output node of the power converter.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein.

DETAILED DISCLOSURE OF THE EMBODIMENTS

The present disclosure will be made using specific examples of a power converter presented below. However, one skilled in the art would realize that the concept of the disclosure is applicable to various other modifications of a power converter.

Figure 1:
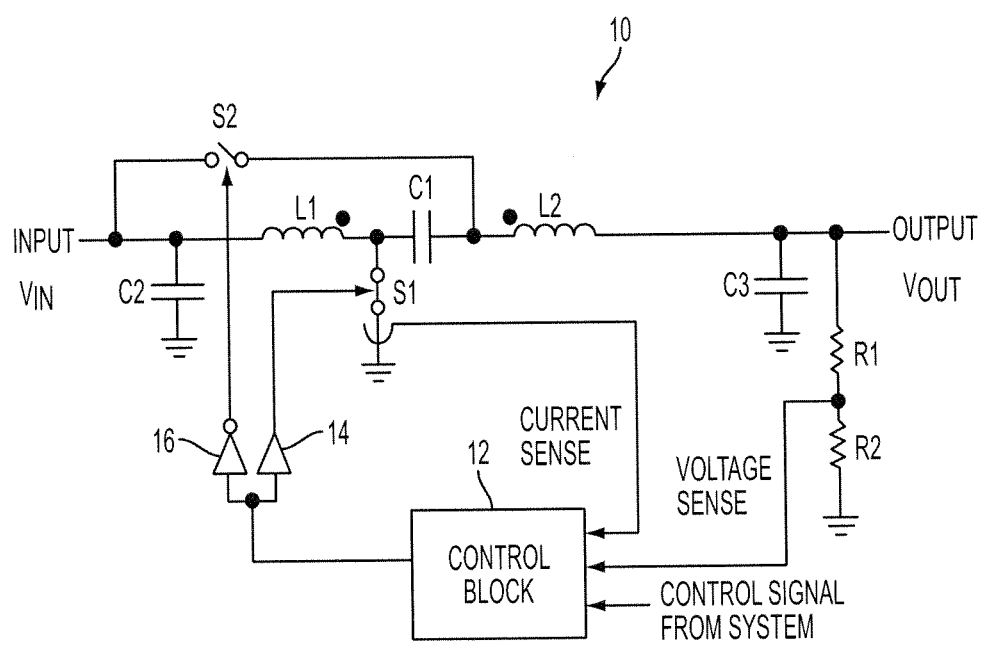
FIG. 1 illustrates an exemplary power converter topology of the present disclosure.

FIG. 1 shows an exemplary power converter 10 of the present disclosure. For example, the converter 10 may produce a DC output voltage Vout at its output node regulated with respect to a DC input voltage Vin supplied at its input node. The converter 10 includes switches S1 and S2 operated out of phase. The switches S1 and S2 may be implemented by field effect transistors. For example, the switch S1 may be an NFET and the switch S2 may be a PFET.

The converter 10 further includes inductor L1 coupled to the input node and inductor L2 coupled to the output node. The inductors L1 and L2 may be coupled inductors or non-coupled inductors. A capacitor C1 is provided between the inductors L1 and L2 for breaking or interrupting a DC current path between the current in the inductor L1 and the current in the inductor L2. The switch S1 may be coupled between a common node of L1 and C1, and a ground node. The switch S2 may be coupled between the input node and a common node of L2 and C1.

A capacitor C2 may be coupled to the input node for filtering an input signal, and a capacitor C3 may be coupled to the output node for filtering an output signal. A voltage divider composed of resistors R1 and R2 may be coupled to the output node for sensing the output voltage Vout.

A control block 12 controls switching of the switches S1 and S2 to produce the regulated output voltage Vout. The control block 12 may be configured for measuring various parameters of the converter 10 to control the switches S1 and S2. For example, FIG. 1 shows that the control block may sense the voltage at a node between the resistors R1 and R2 and may sense the current between the switch S1 and a ground node. Based on these parameters, the control block 12 produces drive signals for controlling the switches S1 and S2 via drivers 14 and 16, respectively. As the switches S1 and S2 are operated out of phase, the driver 16 may include an inverter to produce a signal inverted with respect to the signal at the output of the driver 14. The control block 12 may also be supplied with one or more control signals from the power supply system that includes the converter 10. In particular, the control signal may define a desired polarity of the output signal produced by the converter 10.

As disclosed in more detail below, the control block 12 controls duty cycles of switches S1 and S2 so as to produce the output voltage Vout of a desired polarity in response to the same input voltage Vin. In particular, for the converter 10, the duty cycle D can be calculated by balancing the volt-seconds across L1 and L2 as follows:

$$Vin \cdot D = (Vin - Vout) \cdot (1-D),$$

where D is the duty cycle of the switch S1. Vout can be either positive or negative. The above equation assumes fixed frequency, forced continuous mode operation. Parasitic terms, such as winding resistance and FET resistance, are ignored. Solving for D, $$D = \frac{Vin - Vout}{(2*Vin) - Vout}$$

It is noted that for a zero voltage output, the duty cycle D is equal to approximately 50%. As the output voltage goes positive, the duty cycle decreases below 50%. For negative outputs, the duty cycle increases above 50%.

Hence, by setting or controlling the duty cycle D, for the same polarity of Vin, the converter 10 can produce Vout having a positive polarity, a negative polarity or a zero value. In particular, for a positive polarity of the input voltage Vin, when the duty cycle is set below 50%, the output voltage Vout has a positive polarity; when the duty cycle is set above 50%, the output voltage Vout has a negative polarity; and when the duty cycle is set to approximately 50%, the output voltage Vout has a zero value.

Figure 2A:
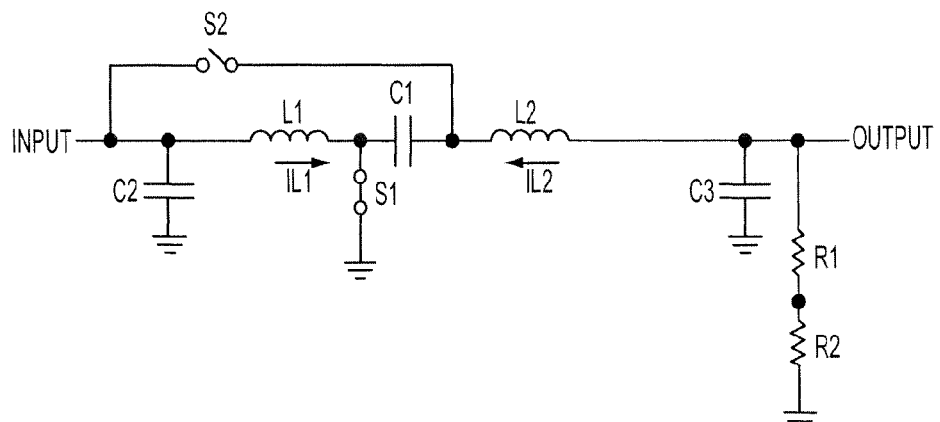
FIGS. 2A-2E and 3A-3E illustrate operation of the power converter in accordance with the present disclosure.

When S1 is on and S2 is off, the current in the inductors L1 and L2 will increase. When S1 is off and S2 is on, the current in the inductors L1 and L2 will decrease. This is illustrated in FIGS. 2A-2E, where FIG. 2A shows elements of the converter 10 in FIG. 1. The inductors L1 and L2 are shown as being uncoupled to simplify the inductor waveforms. The current in the inductor L1 is shown as IL1, and the current in the inductor L2 is shown as IL2.

Figure 2B:
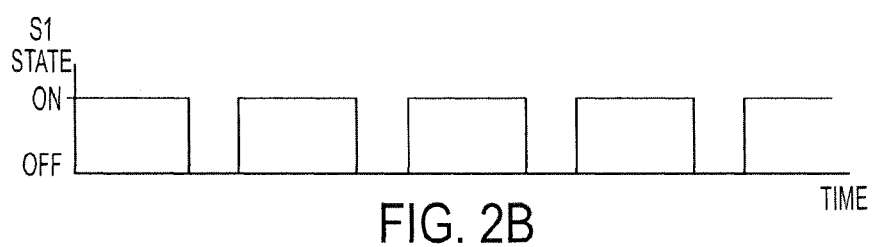
Figure 2C:
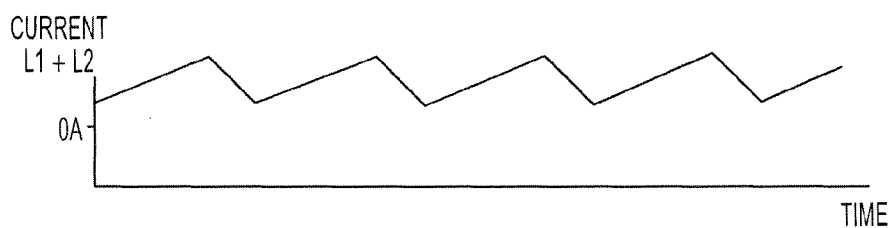
Figure 2D:
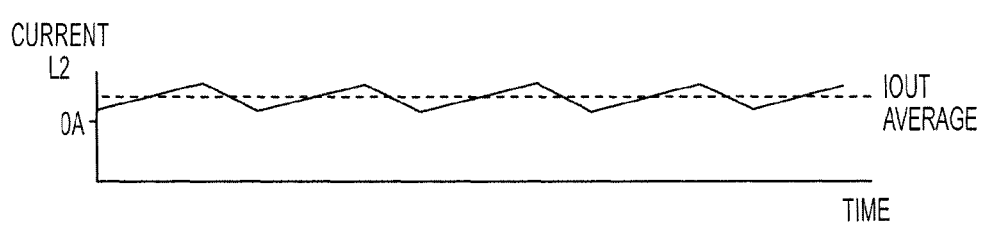
Figure 2E:
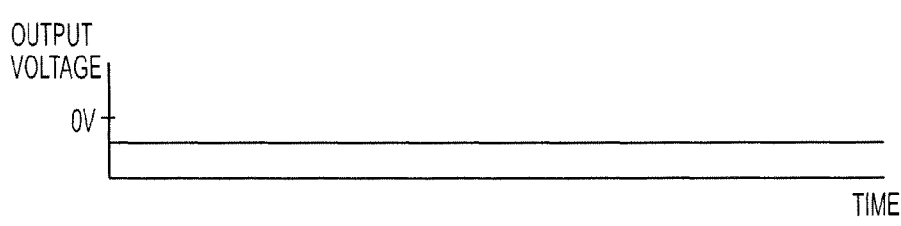

FIGS. 2B-2D are timing diagrams, where FIG. 2B shows the state of the switch S1, FIG. 2C shows combined current in the inductors L1 and L2, FIG. 2D illustrates current in the inductor L2, and FIG. 2E illustrates the output voltage of the converter 10.

In this case, the duty cycle of S1 is greater than 50%, and the output voltage Vout (FIG. 2D) is negative. The average value of the current in the inductor L2 is equal to the average output current (IOUT Average) of the converter 10. In this example, the average output current of the converter 10 is negative, meaning that current is taken out of the output node.

Figure 3A:
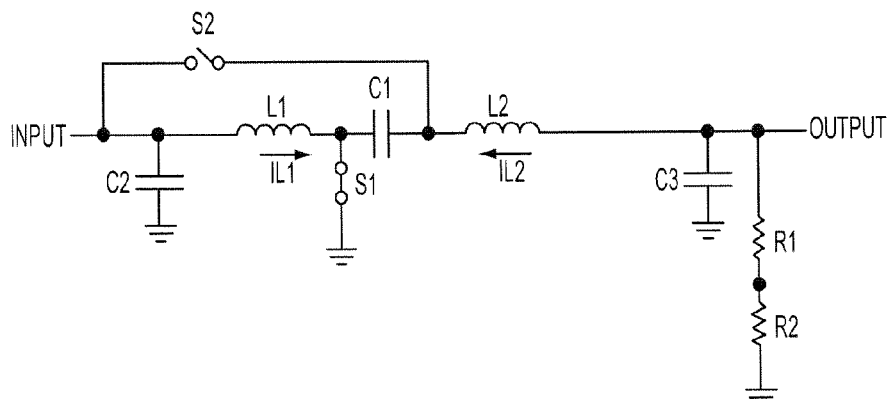
Figure 3B:
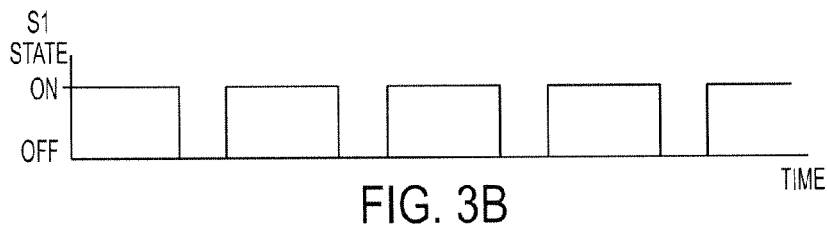
Figure 3C:
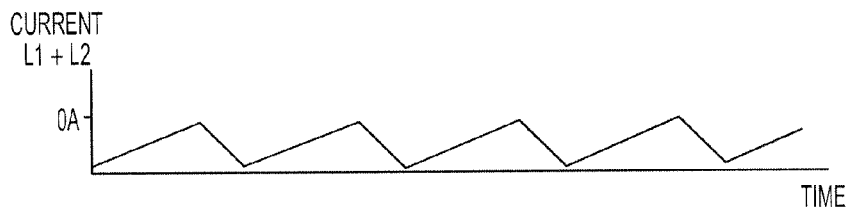
Figure 3D:
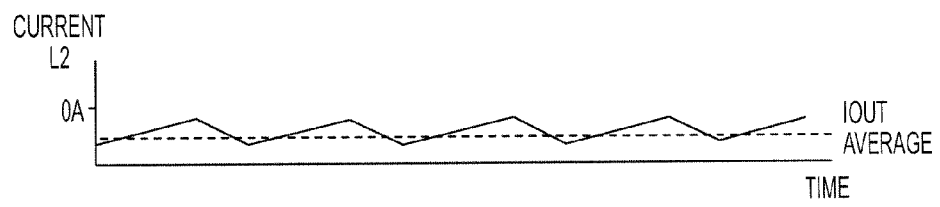
Figure 3E:
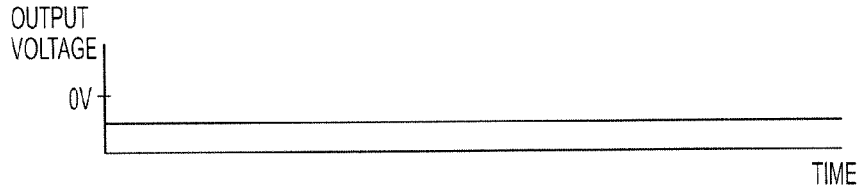

For the same output voltage as in FIG. 2E, the bi-directional nature of the converter 10 can be shown by referring to FIGS. 3A-3E, where FIG. 3A shows elements of the converter 10 in FIG. 1. FIGS. 3B-3D are timing diagrams, where FIG. 3B shows the state of the switch S1, FIG. 3C shows combined current in the inductors L1 and L2, FIG. 3D illustrates current in the inductor L2, and FIG. 3E illustrates the output voltage of the converter 10.

In this case, the duty cycle is the same as in FIG. 2B and is greater than 50%. The output voltage of the converter 10 in FIG. 3E is still negative but the combined current in the inductors L1 and L2 is negative. The average current in the inductor L2 is negative so the average output current of the converter 10 is positive and is opposite to the case illustrated in FIGS. 2A-2E. This means a net positive current is sourced into the output even though the output voltage is still negative. Similar waveforms exist for positive output voltages, but in those cases the duty cycle of S1 will be less than 50%. With positive output voltages, the average output current can also be sourced or sinked from the output node due to the bi-directional nature of the circuit.

Figure 4:
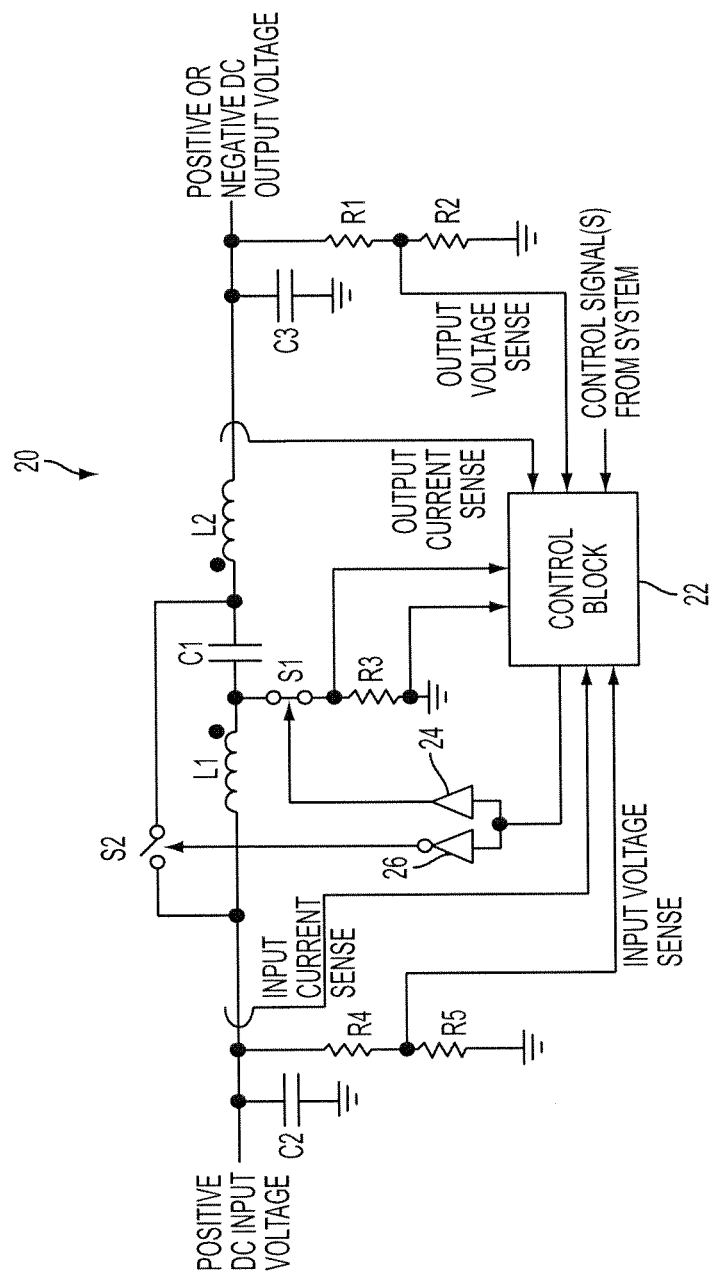
FIG. 4 illustrates an exemplary DC to DC power converter of the present disclosure.

FIG. 4 illustrates an exemplary DC to DC converter 20 configured for producing a regulated positive or negative DC output voltage at the output node based on a positive DC input voltage at the input node. The converter 20 includes switches S1, S2, inductors L1 and L2, capacitors C1, C2 and C3, and resistors R1 and R2 arranged in the same manner as the corresponding elements in FIG. 1. In addition, the converter 20 includes a resistor R3 provided between the switch S1 and the ground node, and a voltage divider composed of resistors R4 and R5 and coupled to the input node.

Also, the converter 20 includes a control block 22 configured to produce drive signals supplied via drivers 24 and 26 to control switching of the switches S1 and S2, respectively. The control block 22 is configured to sense the output voltage at the node between R1 and R2, and/or to sense the input voltage at the node between R4 and R5. Also, the control block 22 is configured for sensing the combined current in the inductors L1 and L2 based on the voltage drop at the resistor R3, for sensing the output current at the output node, and/or for sensing the input current at the input node. In addition, the control block 22 is supplied with one or more control signals from the power supply system. Based on the sensed parameters and the control signals, the control block 22 can control the duty cycle of the switch S1 to produce a DC output voltage of a desired polarity or a zero voltage DC output signal based on a positive DC input voltage.

Figure 5:
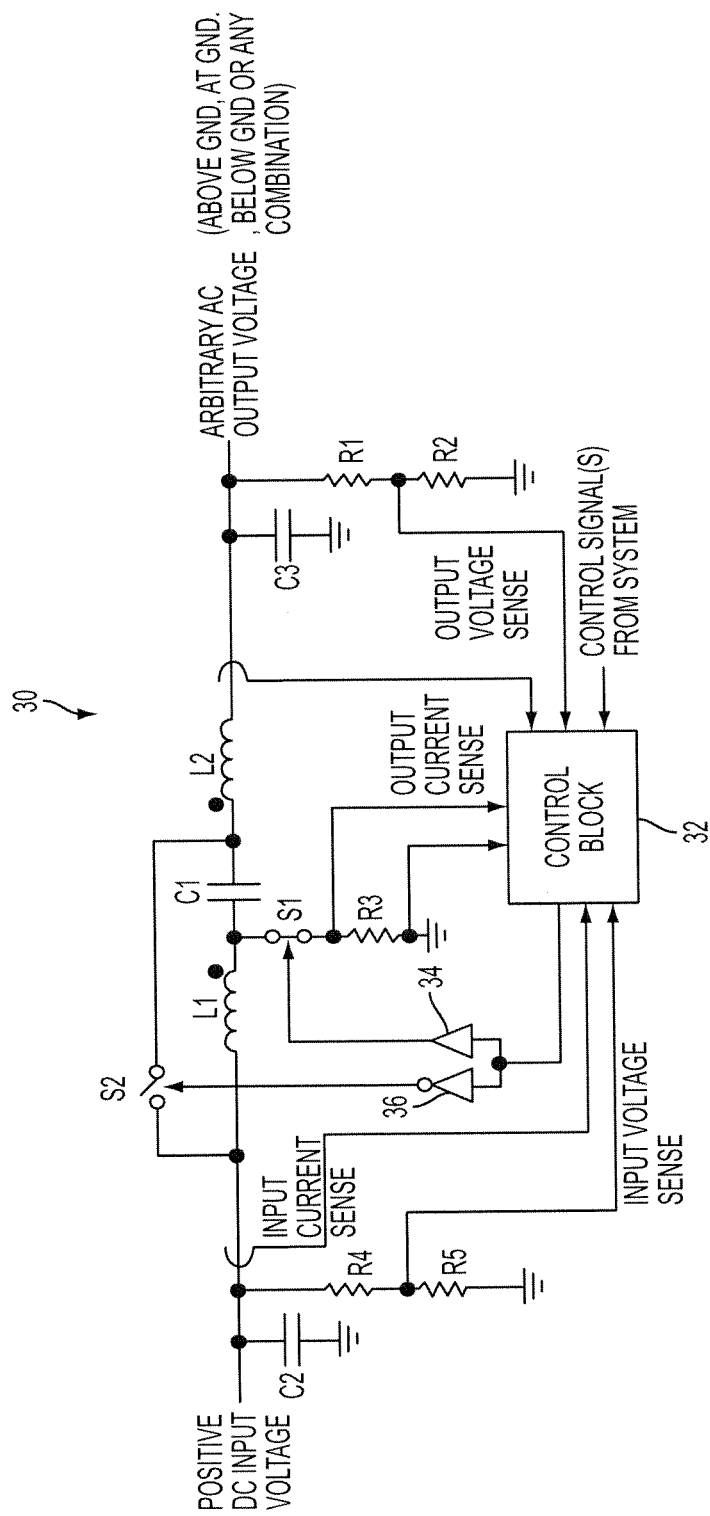
FIG. 5 illustrates an exemplary DC to AC power converter of the present disclosure.

FIG. 5 illustrates an exemplary converter 30 configured to produce a regulated arbitrary AC output signal at its output node based on a positive DC input voltage at its input node. The AC output voltage formed at the output node can be above a ground potential, below a ground potential or at ground potential. Alternatively, the AC output voltage can be a combination of signals above a ground potential, below a ground potential or at a ground potential.

The elements of the converter 30 shown FIG. 5 are similar to the elements of the converter 20 shown in FIG. 4. However, as discussed below, the control block 32 is configured to produce a desired AC output voltage. For example, the converter 30 in FIG. 5 can take a positive input voltage of 12 V, and generate a sinusoidal output voltage with positive amplitude of +5V and negative amplitude of −5V. The frequency of the sinusoidal output is defined by the control block 32. In another example, the output signal can be formed as a triangle wave with various positive and negative amplitudes and frequencies.

Figure 6:
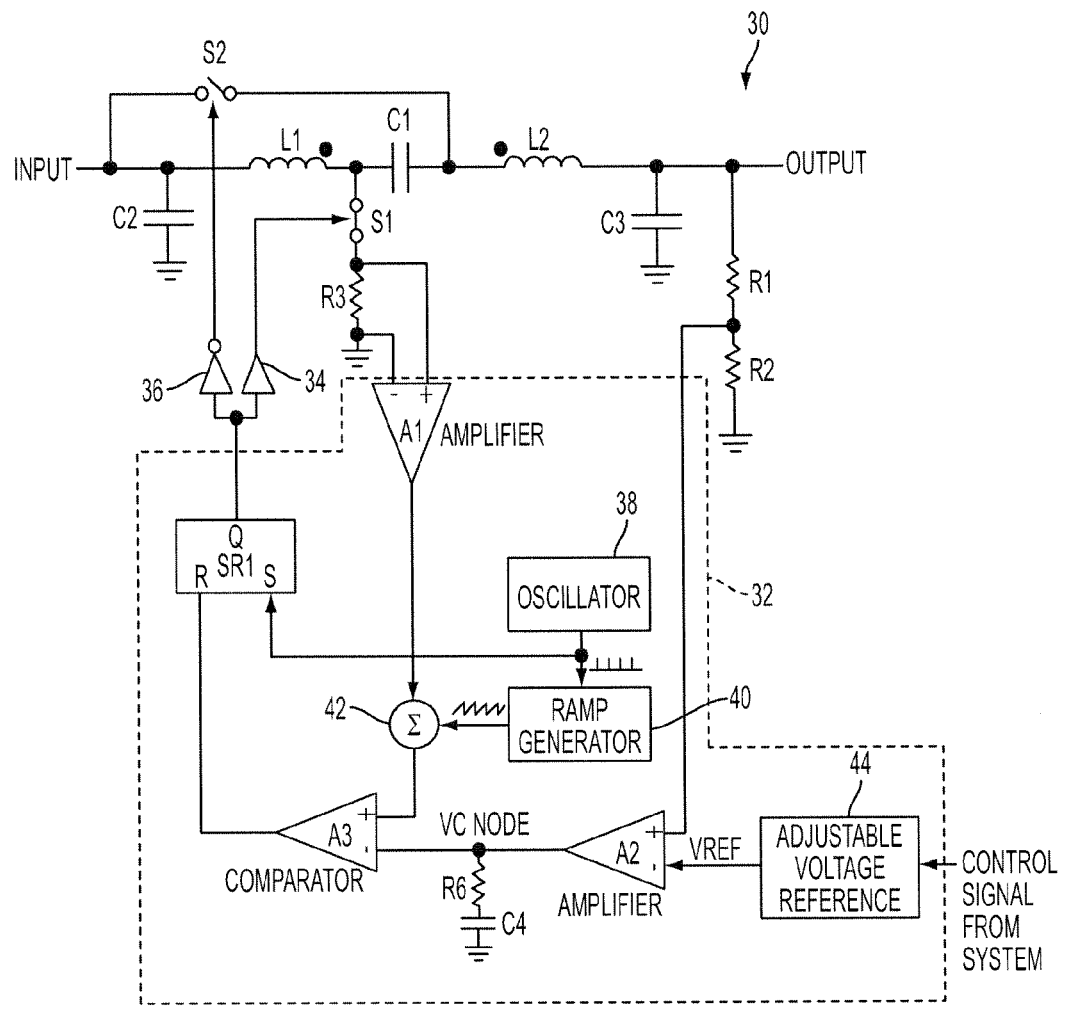
FIG. 6 illustrates an exemplary implementation of the power converter in FIG. 5.

An exemplary implementation of the converter 30 is shown in FIG. 6. This implementation is using current mode switching regulator control techniques to vary the duty cycle and timing of switches S1 and S2. Therefore, the elements in FIG. 5 configured for sensing the input voltage and the input current are not included in the implementation of the converter 30 in FIG. 6. It is noted that switches S1 and S2 could be NFETs or PFETs or one of them can be NFET and the other can be PFET. It is not relevant to circuit operation. However, configuration of the drivers 34 and 36 may depend on the type of transistors selected for S1 and S2.

The control block 32 includes an oscillator 38 that generates a series of pulses at a fixed frequency. The oscillator 38 controls a ramp generator 40 that produces a ramp signal supplied to an adder 42. The other input of the adder 42 is coupled to the output of an amplifier A1 that senses the combined current in the inductors L1 and L2 based on the voltage drop at the resistor R3. The adder 42 sums the output signal of the amplifier A1 with the ramp signal to provide slope compensation required to avoid sub-harmonic oscillations in current mode controlled switching regulators.

A control signal defining a desired polarity of the output signal is supplied to an adjustable voltage reference block 44 to produce a variable reference signal VREF having a positive voltage value, a negative voltage value or a ground potential. An amplifier A2 has a non-inverting input for receiving a voltage representing the output voltage Vout sensed at the output node via the voltage divider R1 and R2. The amplifier A2 compares the voltage representing Vout with the variable reference voltage VREF supplied to an inverting input of the amplifier A2, to produce a voltage control (VC) signal at a VC node coupled to a ground node via an RC circuit composed of a resistor R6 and a capacitor C6.

A comparator A3 compares the VC signal provided at its inverting input with and the output signal of the adder 42 supplied at its non-inverting input. The output of the amplifier A3 is coupled to a reset input R of an SR latch SR1. A set input S of this flip flop is supplied with the output signal of the oscillator 38.

If the VC signal rises, then the control block 32 controls the switches S1 and S2 so as to increase the combined peak current in the inductors L1 and L2. If the VC signal falls, then the control block 32 reduces the combined current in the inductors L1 and L2.

When the latch SR1 is set at the beginning of each clock period by the output of the oscillator 38, the output Q of the latch SR1 goes high. This turns on switch S1 and turns off switch S2. Since S1 is on, the combined current in L1 and L2 increases in reference to how much current flows out of the polarity dot terminal between the inductor L1 and the capacitor C1. The combined current flows through the sense resistor R3. The current in the inductor L2 may flow through capacitor C1 to switch S1, and then through the resistor R3. When the peak voltage signal generated in the resistor R3 reaches the commanded level, as determined by the voltage on the VC node and the level of the ramp signal, then the output of the comparator A3 goes high. As a result, the R input to the latch SR1 goes high and the latch SR1 resets. Its output Q goes low turning off the switch S1 and turning on the switch S2. This process continues and the net result is the output voltage regulated to the desired level.

Figure 7A:
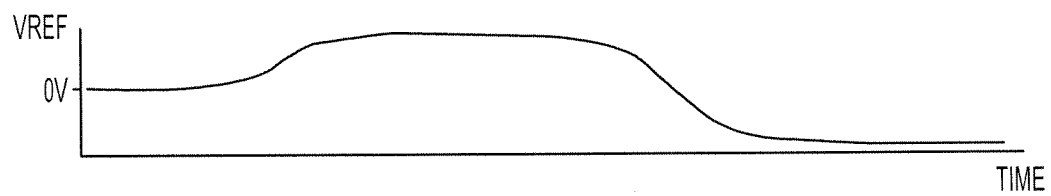
FIGS. 7A-7C are timing diagrams illustrating operation of the power converter in FIG. 6.
Figure 7B:
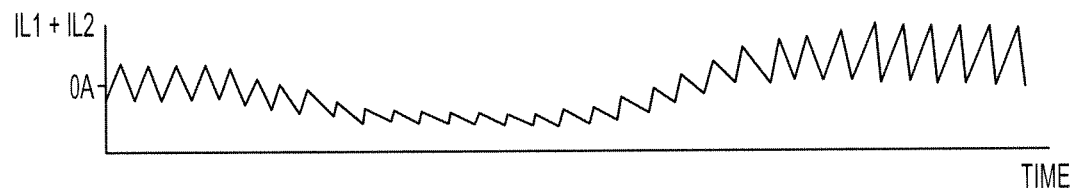
Figure 7C:
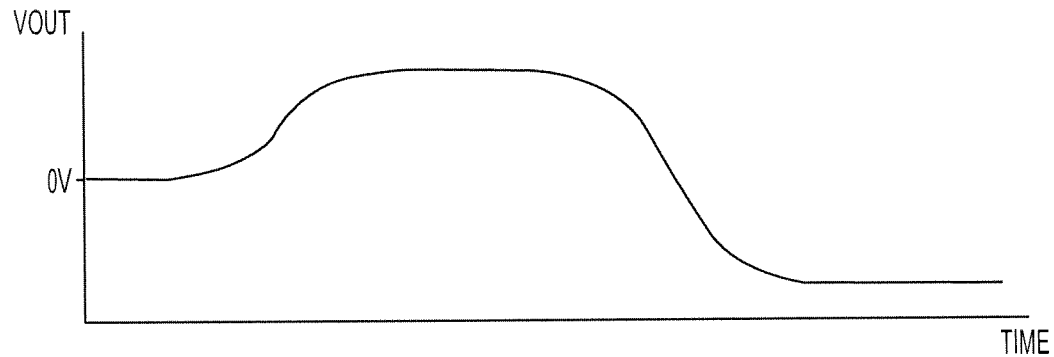

Timing diagrams in FIGS. 7A-7C illustrate operation of the converter 30 in FIG. 6. The diagram in FIG. 7A shows an exemplary VREF signal as it is controlled to change from its initial 0V to a positive voltage, then to a negative voltage. Assuming a fixed resistive load element on the output of the converter 30, the change in the VREF signal causes a commanded change in the desired output voltage Vout. To achieve this desired change in the output voltage, the commanded combined peak current of the inductors L1 and L2 (FIG. 7B) is changed by a changing voltage on the VC node.

The diagram in FIG. 7C shows the resulting output voltage Vout. When the VREF signal is at 0V, the output voltage Vout is also at 0V and the duty cycle of S1 is at approximately 50%. The duty cycle of S1 is determined by the ratio of the upslope portion of the combined inductor current waveform in FIG. 7B compared to the total period, which includes the upslope portion and the downslope portion of the combined inductor current waveform in FIG. 7B.

As the VREF signal climbs to a positive level, the VC voltage falls so that commanded combined peak current in the inductors L1 and L2 also falls. The duty cycle D of the switch S1 reduces as the Vout signal climbs to a positive level. As the VREF signal is now commanded to a negative level from a positive one, the VC signal now climbs and the commanded combined current in the inductors L1 and L2 rises. The Vout goes to a negative level and the duty cycle of S1 rises to above 50%.

It is noted that the implementation in FIG. 6 is just one of many possible implementations of the control block 32. An alternative implementation may use a voltage mode control technique to control the converter 30. Also various types of non-fixed frequency techniques, including a Pulsed Frequency Modulation (PFM) technique, may be used to control the converter 30.

Other techniques may be also used to provide changing or control of the output voltage Vout. For example, in many circuits the generation of a negative VREF voltage might be difficult since it requires a negative potential to be generated for use by the control block 32. An exemplary implementation of the converter 30 shown in FIG. 8 allows the converter 30 to generate a negative output voltage without producing a negative VREF voltage inside the control block 32.

Figure 8:
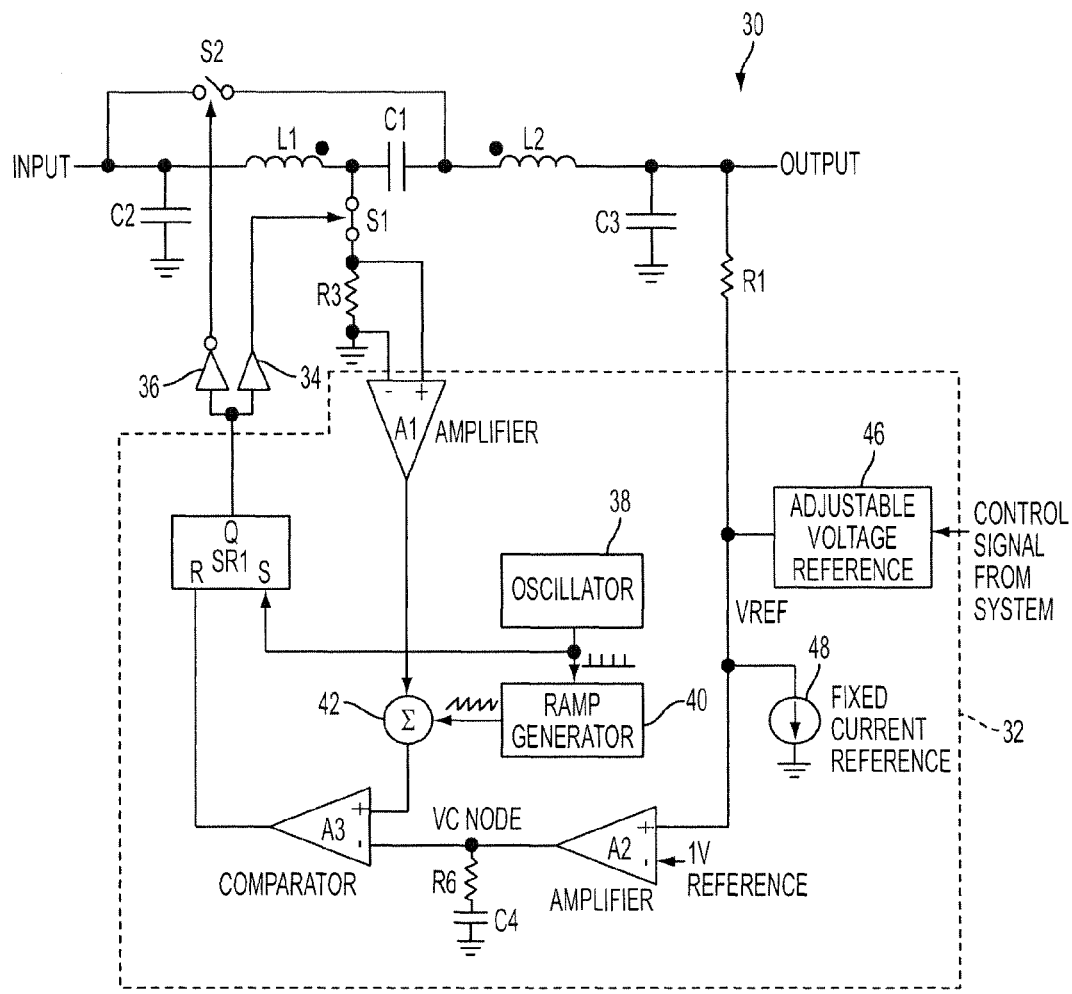
FIG. 8 illustrates another exemplary implementation of the power converter in FIG. 5.

The elements shown in FIG. 8 are similar to the elements in FIG. 6, but the adjustable voltage reference block 44 is replaced with the adjustable current reference block 46 and the fixed current reference block 48. Also, the inverting input of the amplifier A2 is fixed to a single positive reference voltage that can be set, for example, to 1V.

The control signal from the power supply system supplied to the adjustable current reference block 46 varies the amplitude and polarity of an adjustable current reference value produced by the adjustable current reference block 46 at the VREF node. The fixed current reference block 48 provides a fixed reference current at the VREF node controlled by the adjustable current reference value that defines the output voltage Vout of the converter 30. In this scheme, the voltage level on the VREF node is regulated to 1V. For example, when the adjustable current reference value is set to zero, the output voltage Vout is equal to (1V+Iref×R1), where Iref is a value of the fixed reference current provided by the fixed current reference block 48 and R1 is resistance of R1. This results in a positive output voltage.

If the adjustable current reference value is controlled to pull more current out of the VREF node, then the output voltage Vout will go more positive. If the adjustable current reference value is controlled to source current into the VREF node, then the output voltage Vout will begin to drop and can become negative if commanded to do so. This type of scheme allows the control block 32 to operate only from sources of a positive voltage.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art.

The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein.

What is claimed is:

1. A power converting system responsive to an input signal to produce an output signal regulated with respect to the input signal, the system comprising:
   an input node for receiving the input signal,
   an output node for producing the output signal,
   a first inductive element having a first node coupled to the input node,
   a second inductive element having a first node coupled to the output node,
   a first switching element coupled to a second node of the first inductive element,
   a second switching element coupled directly between the first node of the first inductive element and a second node of the second inductive element,
   a first capacitive element coupled between the second node of the first inductive element and the second node of the second inductive element, and
   a control circuit for controlling the first switching element, the control circuit being configured to set a duty cycle of the first switching element to a first value for providing the output signal of a first polarity in response to the input signal of the first polarity, and to set the duty cycle of the first switching element to a second value for providing the output signal of a second polarity in response to the input signal of the first polarity.

2. The system of claim 1, wherein the first value of the duty cycle is in a first duty cycle range, and the second value of the duty cycle is in a second duty cycle range higher than the first duty cycle range.

3. The system of claim 2, wherein the control circuit is configured to set the duty cycle to a third value between the first duty cycle range and the second duty cycle range to provide a zero amplitude signal at the output node.

4. The system of claim 1, wherein the second switching element is turned off when the first switching element is turned on, and the second switching element is turned on when the first switching element is turned off.

5. The system of claim 1, further comprising an input filtering capacitive element coupled to the input node, and an output filtering capacitive element coupled to the output node.

6. The system of claim 1, wherein a regulated DC output signal is produced at the output node in response to a DC input signal at the input node.

7. The system of claim 1, wherein a regulated AC output signal is produced at the output node in response to a DC input signal at the input node.

8. The system of claim 1, wherein the control circuit is configured for sensing a combined current in the first and second inductive elements to control the first switching element.

9. The system of claim 1, wherein the control circuit is configured for sensing an output voltage of the power converting system to control the first switching element.

10. The system of claim 1, wherein the control circuit is configured for sensing an output current of the power converting system to control the first switching element.

11. The system of claim 1, wherein the control circuit is configured for sensing an input voltage of the power converting system to control the first switching element.

12. The system of claim 1, wherein the control circuit is configured for sensing the input current of the power converting system to control the first switching element.

13. The system of claim 1, wherein the control circuit includes an adjustable voltage reference block controlled by a control signal to produce a variable reference signal having a positive voltage value, a negative voltage value or a zero voltage value.

14. The system of claim 13, wherein the control circuit is configured to compare the variable reference signal with a signal representing the output voltage of the converting system, to produce a voltage control (VC) signal.

15. The system of claim 14, wherein the control circuit is further configured to compare the VC signal with a signal representing a combined current in the first and second inductive elements, to produce a driving signal that controls switching of the first switching element.

16. The system of claim 15, wherein the control circuit includes an inductive current sensing and slope compensation circuit for producing the signal representing a combined current in the first and second inductive elements.

17. The system of claim 16, wherein the inductive current sensing and slope compensation circuit comprises a ramp generator controlled by an oscillator for producing a ramp signal.

18. The system of claim 16, wherein the inductive current sensing and slope compensation circuit further includes a current sensor for sensing the combined current in the first and second inductive elements.

19. The system of claim 18, wherein the inductive current sensing and slope compensation circuit further includes an adder responsive to the ramp signal and to an output signal of the current sensor for producing the signal representing a sensed combined current in the first and second inductive elements.

20. The system of claim 19, wherein the control circuit further includes a latching circuit controlled by an output signal of the oscillator and by an output signal of a comparator that compares the voltage control signal with the signal representing a combined current in the first and second inductive elements, the latching circuit being configured to produce the driving signal that controls switching of the first switching element.

21. The system of claim 1, wherein the control circuit includes an adjustable current reference block responsive to a control signal for producing a current reference value of variable amplitude and polarity at a reference node coupled to the output node of the power converting system.

22. The system of claim 21, wherein the control circuit is configured for comparing a signal at the reference node with a fixed value to produce a voltage control (VC) signal.

23. The system of claim 22, wherein the control circuit is further configured to compare the VC signal with a signal representing a combined current in the first and second inductive elements, to produce a driving signal that controls switching of the first switching element.

24. A method of producing an output signal in response to an input signal, using a power converter having an input node for receiving the input signal, an output node for producing the output signal, a first inductive element coupled to the input node, a second inductive element coupled to the output node, a first capacitive element coupled between the first inductive element and the second inductive element, a first switching element coupled to the first capacitive element, and a second switching element coupled directly between the input node and the second inductive element, the method comprising the steps of:
controlling the first switching element to produce the output signal regulated with respect to the input signal,
wherein the controlling of the first switching element comprises:
setting a duty cycle of the first switching element to a first value to produce the output signal of a first polarity in response to the input signal of the first polarity, and
setting the duty cycle of the first switching element to a second value to produce the output signal of a second polarity in response to the input signal of the first polarity, and
controlling the second switching element by turning off the second switching element when the first switching element is tuned on, and turning off the second switching element when switching element is turned off.

25. The method of claim 24, wherein the first value of the duty cycle is in a first duty cycle range, and the second value of the duty cycle is in a second duty cycle range higher than the first duty cycle range.

26. The method of claim 25 further comprising the step of setting the duty cycle to a third value between the first duty cycle range and the second duty cycle range to produce a zero amplitude signal at the output node.

27. The method of claim 26, wherein the step of controlling the first switching element includes sensing a combined current in the first and second inductive elements.

28. The method of claim 27, wherein the step of controlling the first switching element further includes producing a variable reference signal having a positive voltage value, a negative voltage value or a zero voltage value.

29. The method of claim 27, wherein the step of controlling the first switching element further includes producing a current reference value of variable amplitude and polarity at a reference node coupled to the output node of the power converter.

30. The system of claim 1, wherein the control circuit controls the first switching element based on a measured current flowing through the first switching element and a measured current input to the power converting system.

31. The method of claim 24, further comprising a step of:
measuring a current flowing through the first switching element and a current input to the power converting system,
wherein the first switching element is controlled based on the measured current flowing through the first switching element and the measured current input to the power converting system to produce the output signal regulated with respect to the input signal.

\* \* \* \* \*